United States Patent [19]

Miller

[11] Patent Number: 4,470,734

[45] Date of Patent: Sep. 11, 1984

[54] PORTABLE TUBE END PREPARATION TOOL

[75] Inventor: Richard E. Miller, Citrus Heights, Calif.

[73] Assignee: Tri Tool, Inc., Rancho Cordova, Calif.

[21] Appl. No.: 406,542

[22] Filed: Aug. 9, 1982

[51] Int. Cl.³ .............................................. B23C 3/02
[52] U.S. Cl. .................................. 409/175; 82/4 C; 408/82; 408/104
[58] Field of Search ................... 279/2 R; 408/80, 82, 408/104, 146; 82/4 C, 4 R; 409/175, 180, 181, 178, 179; 144/205; 173/33

[56] References Cited

U.S. PATENT DOCUMENTS

| | | | |
|---|---|---|---|
| 3,051,059 | 9/1962 | Davey | 408/82 |
| 3,131,599 | 5/1964 | MacFarlane et al. | 409/180 |
| 3,228,268 | 9/1963 | Strout | 408/104 |
| 3,330,366 | 7/1967 | Lowry et al. | 279/2 X |
| 4,319,503 | 3/1982 | Saine et al. | 82/4 C |

Primary Examiner—William R. Briggs
Attorney, Agent, or Firm—Bacon & Thomas

[57] ABSTRACT

A portable tube end preparation tool includes a right angle drive motor (44) for rotating the cutter head (16) and a right angle cutter feed nut drive shaft (78), both motor and feed nut drive shaft capable of being positioned in the same general plane to provide a narrow and short tool profile for enabling the tool to be used in very confined areas. The drive motor and feed nut drive system are mounted in separate sub-assemblies for enabling simple repair and inspection of the tool without complete or substantial disassembly of the tool, and to permit the feed nut drive to be rotated to different radial positions.

8 Claims, 5 Drawing Figures

PORTABLE TUBE END PREPARATION TOOL

BACKGROUND OF THE INVENTION

1. Field of the Invention

The present invention is a portable tool for machining the end of a pipe or tube workpiece for enabling subsequent welding of the workpiece. Such tools are commonly referred to in the welding field as pipe or tube end preparation tools.

2. Description of the Prior Art

Portable tube end preparation tools are generally well-known in the prior art, and are exemplified in U.S. Pat. Nos. 3,051,059, 3,228,268, and 4,319,503. In such prior art tools, the drive motor or drive shaft is commonly disposed at a right angle to the rotational axis of the cutter head of the tool or axially in line with such axis. The feed of the cutter head into the workpiece, on the other hand, is more commonly achieved through manual rotation of a feed nut about an axis that coincides with the rotational axis of the cutter head. Although transversely extending feed drive arrangements are known per se, it has not heretofore been suggested to utilize a right angle drive system for the cutter head in combination with a right angle drive system for the feed nut in a compact tube end preparation tool. More commonly, in accordance with the prior art, the design of the tool required the placement of a feed nut and its associated actuator, which is usually a hand wheel or knob, at the rearward end of the tool, which resulted in a tool length that was inappropriate for use in highly confined areas and was inconvenient for an operator under certain operational conditions. The present invention is intended to provide a portable tube end preparation tool that is extremely compact both in width and length so that it is particularly well-suited for use in confined areas. Moreover, the present invention contemplates a drive motor system and a feed nut manipulating system that is more convenient to use by an operator of the tool.

BRIEF SUMMARY OF THE INVENTION

The present invention is an improvement in a portable pipe end preparation tool, whereby a tool housing is constructed in a manner whereby it is extremely short in length, narrow in width, and arranged to be easily manipulated by an operator. This is achieved by locating the cutter head drive motor and its associated drive shaft so that it extends transversely of the longitudinal axis of the tool and also locating the feed nut drive mechanism so that it likewise extends at a right angle to the tool axis, preferably parallel to the drive motor axis. Both the motor and the feed nut are preferably located in the same plane with the tool housing so that one hand of an operator can conveniently manipulate the tool by grasping the motor housing while the other hand can conveniently advance the tool into the workpiece from the same side of the tool by manipulating the feed nut which is presented closely adjacent the motor housing. This results in an extremely compact tool that can be operated from one side of the tool (a keen advantage when the tool is being used a distance away from the operator) in extremely confined areas, or where the tool is being used to prepare overhead tubes.

The tool is commonly used with a mandrel that connects the tool to a tubular workpiece adjacent the end of the workpiece. In accordance with the present invention, the mandrel shaft, which extends through the tool during operation of the tool, is keyed to the interior of the housing so that the torque of the drive motor system is reacted into the mandrel shaft and into the workpiece, which is usually held fixed.

A system of bevel gear drive trains is utilized in the cutter head drive system as well as the feed nut drive mechanism. Needle bearings are provided between the cutter head drive shaft and the mandrel shaft to prevent wear in this area and to permit maintenance of an extremely compact cutter drive shaft arrangement.

The drive motor system for the cutter head and the feed nut drive system are both made as separate subassemblies whereby they can be removed readily from the tool housing for convenient repair or inspection without requiring substantial or complete disassembly of the tool. The feed nut drive assembly can be adjusted to position the feed knob at various locations transverse to the longitudinal axis of the tool, if desired. All of this is accomplished within an extremely compact tool envelope, resulting in a tool that is highly attractive for use in extremely confined working areas or under circumstances where the tool must be manipulated at a distance from the operator.

Other features and advantages of the invention will become evident from a consideration of the following description of a preferred embodiment of the invention.

BRIEF DESCRIPTION OF THE DRAWINGS

FIG. 5 is a view taken along section V—V of FIG. 1.

DETAILED DESCRIPTION OF PREFERRED EMBODIMENT

Figure 1:
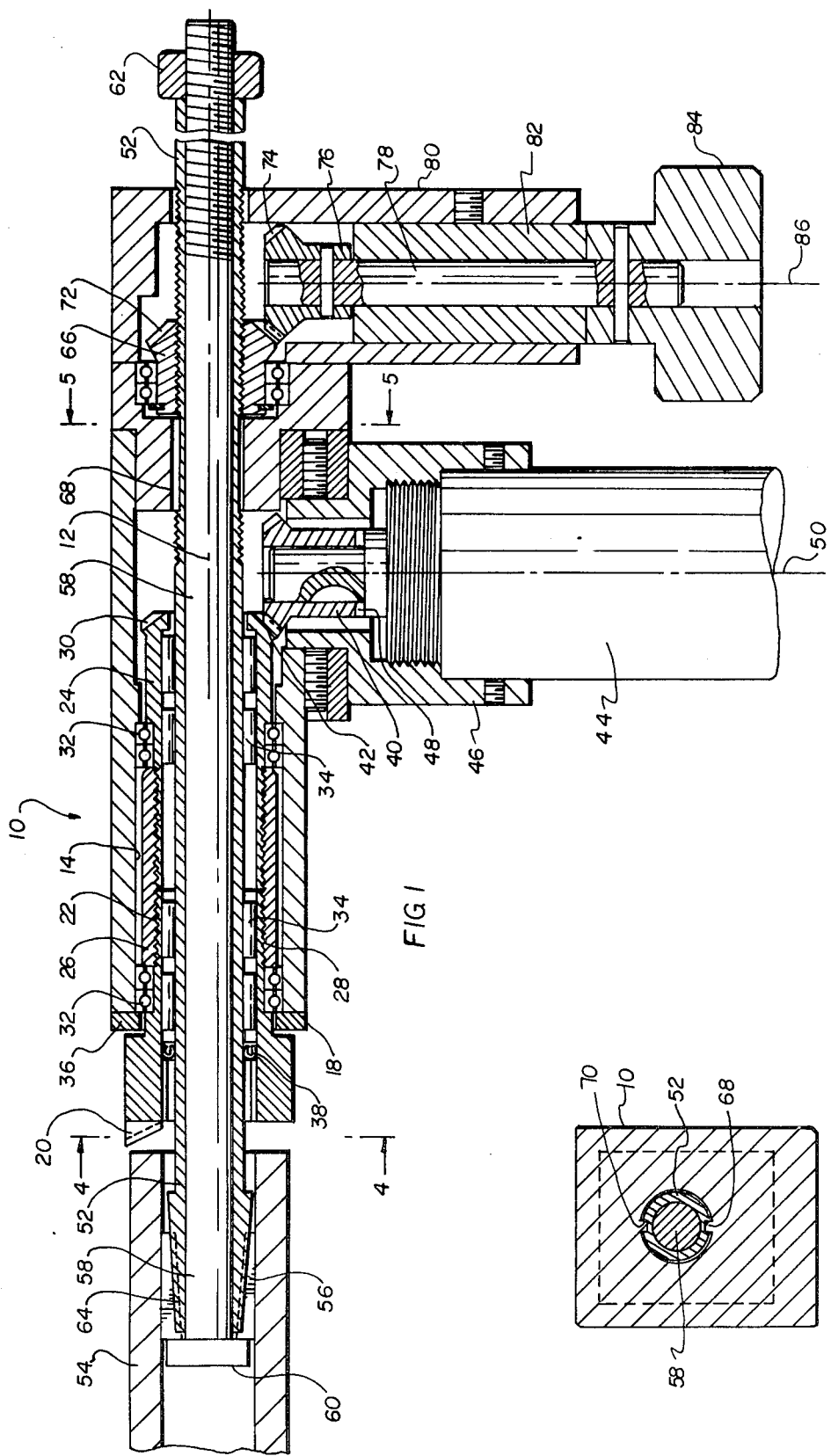
FIG. 1 is a side elevation view taken along a central section of a preferred embodiment of a pipe end preparation tool constructed in accordance with the present invention.
Figure 2:
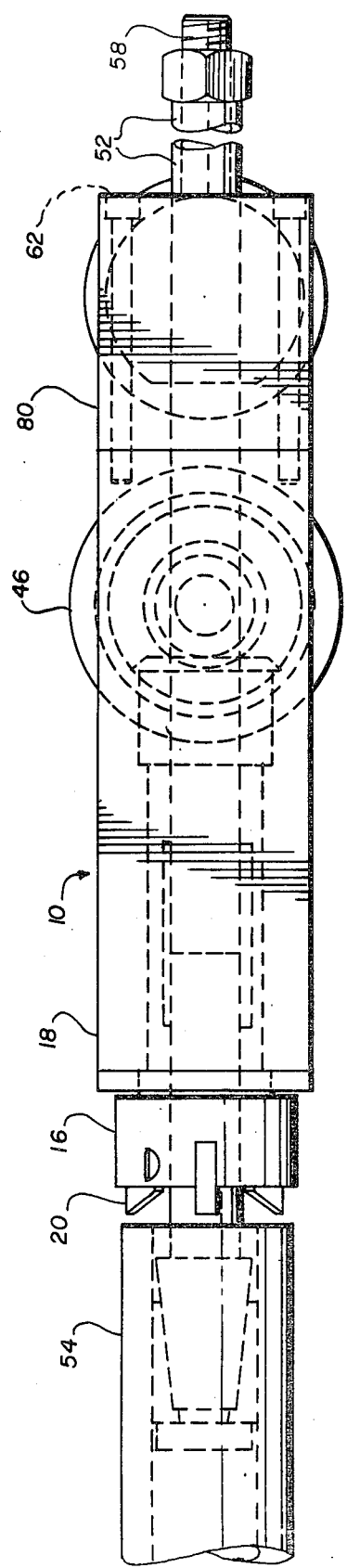
FIG. 2 is an upper view of FIG. 1.
Figure 4:
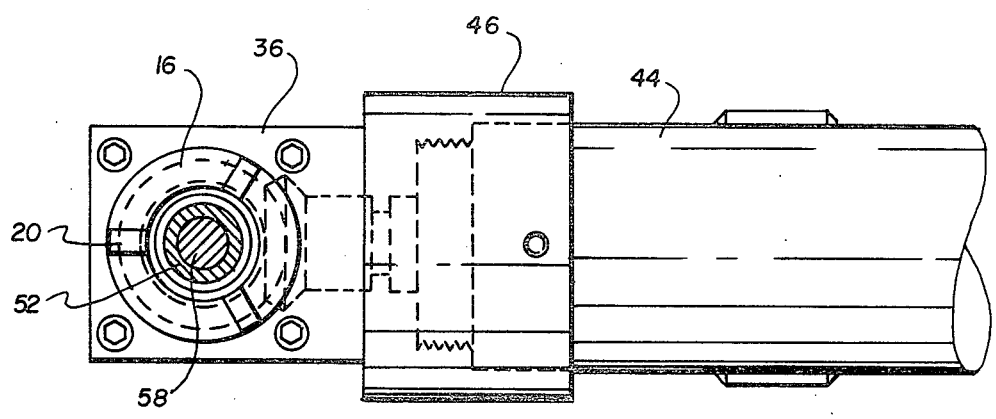
FIG. 4 is a left end view of FIG. 1 taken along line IV—IV of FIG. 1.

With reference to FIG. 1, a pipe end preparation tool embodying a preferred form of the present invention is shown at 10. The housing 10 extends along a longitudinal axis 12 and includes a longitudinal opening 14 extending substantially along the longitudinal axis of the housing.

A cutter head 16 is connected to the open, forward end 18 of the housing 10, the cutter head 16 being mounted for rotation about longitudinal axis 12. Tool cutter bits 20, for example, beveling, facing, and/or boring bits, are secured by suitable means to the forward end of the cutter head 16 in a suitable manner. The cutter head 16 is annular in shape for reasons that will be explained more fully below, and is mounted to the housing 10 by means of a drive shaft system and associated bearings. The drive shaft system for the cutter head 16 includes a first drive shaft part comprising a first shaft portion 22, a second shaft portion 24, and a coupling sleeve 26 that joins the shaft portions 22, 24 together by means of a threaded connection 28. The threaded connection 28 includes external threads on drive shaft portions 22, 24 and internal threads on the coupling 26. The first and second drive shaft portions 22, 24 are hollow, and the second drive shaft portion 24 is connected to a 45° bevel gear 30, which is annular in form.

The drive shaft portions 22, 24 are supported within the housing 10 by means of bearings 32 that are axially spaced along the longitudinal axis 12 of the housing 10. The coupling sleeve 26 axially engages the bearings 32, while the bearings themselves engage the first and second shaft portions 22, 24, whereby the cutter head 16 and the first drive shaft part, including drive shaft portions 22, 24 are constrained against axial and radial movement within the housing 10. In effect, sleeve 26 is a spacer between bearings 32, and may be arranged to react axial loads (thrust loads) in the bearings 32.

Rolling needle bearings 34 are disposed within shaft portions 22, 24 along the longitudinal axis 12 for supporting a mandrel shaft (to be described below) within the drive shaft portions.

A cover 36 is attached to the end 18 of housing 10 and extends between the drive shaft portion 22 and housing 10 for retaining the drive shaft assembly and the associated bearing in the housing 10. Seals 38 may be provided within the cutter head 16 and drive shaft portion 22 for preventing entry of contamination into the housing along the mandrel shaft (yet to be described). The cutter head drive system includes a second drive shaft part 40 that includes a 45° bevel gear 42 that drivingly engages bevel gear 30 on the end of drive shaft portion 24.

A drive motor 44 is connected to housing 10 through an adapter 46 that is secured by a suitable fastener to the housing. The motor 44 includes a motor drive shaft 48 that is keyed to the second drive shaft part 40 in a suitable manner whereby the bevel gear 42 is driven by the motor drive shaft 48.

The motor 44, adapter 46, and the second drive shaft part 40 are removable as a unit from the exterior of the housing 10 for inspection or repair without needing to disassemble the remaining part of the cutter head drive system. Moreover, the second drive shaft part 40 extends along a transverse axis 50. The motor housing 44, which is compact and cylindrical in form to enable easy grasping and manipulation by an operator, likewise extends along the transverse axis 50 and serves to provide a manipulating handle for the tool housing 10.

A mandrel assembly including a hollow mandrel shaft 52 extends longitudinally through the housing 10, and through the cutter head 16, drive shaft portions 22, 24 and bevel gear 30. The mandrel shaft 52 secures the tool to a workpiece 54 in a well-known manner. The workpiece 54 typically is due to be machined at its end by the tool bits 20 to prepare the tube for welding. In addition to the mandrel shaft 52, the mandrel includes radially expanding blades 56 that are arranged to be driven radially outwardly into engagement with the interior of the tube by a draw bar 58 which includes an enlarged end 60. The draw bar 58 is longitudinally moved by means of a mandrel actuating nut 62 located at the opposite end of the bar 58 (to the right of FIG. 1). The mandrel actuating nut 62 is threadedly engaged to the draw bar 58, whereby rotation of the nut 62 causes the bar 58 to move longitudinally within the mandrel shaft 52 to cause the blades 56 to ride along a cam surface presented on an enlarged end 64 of mandrel shaft 52. The various details of the mandrel construction are well-known in the art and do not constitute a part of this invention, with the exception of the antirotation keying arrangement that will be described in conjunction with the description of the feed nut arrangement for the tool.

According to the present invention, a feed nut 66 that is annular in form and includes internal helical threads is provided within housing 10 in axially spaced relationship with respect to the cutter head drive shaft elements. Mandrel shaft 52 extends through feed nut 66 and includes external threads that are coupled to the internal threads of the feed nut 66, whereby rotation of the feed nut causes relative axial motion between housing 10 and mandrel shaft 52. If the workpiece 54 is fixed, for example, rotation of the feed nut 62 causes the tool housing 10, including the cutter head 16, to advance into engagement with the the tube end. On the other hand, if the tool housing is held fixed while the tube workpiece 54 is permitted to translate along its longitudinal axis, rotation of feed nut 66 will put the tube 54 into the cutter bits 20 via axial movement of mandrel shaft 52.

The housing 10 and mandrel shaft 52 are prevented from rotating relative to each other by a torque reacting key arrangement best seen in FIG. 5. The housing 10 (or a suitable sub-assembly connected to the housing 10) includes longitudinally and radially extending keys 68 and a longitudinally extending keyway 70 is provided along the periphery of mandrel shaft 52. Accordingly, when the mandrel shaft 52 is placed within the housing and secured to the workpiece by blades 56, the workpiece 54 is locked against rotation, the mandrel shaft 52 will in turn lock the housing 10 against rotation about the longitudinal axis 12, despite the torque applied to the drive shaft portions 22, 24 by motor 44. This results in the tool having a "self-torque accepting feature" that is highly desirable in a tool of this type. Without this feature, the operator would need to react the torque of the drive motor while the tool is operating, which tends to induce operator fatigue.

Figure 3:
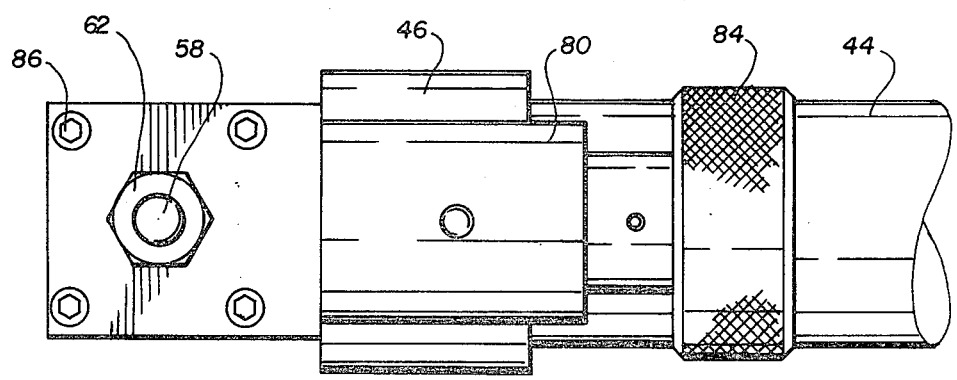
FIG. 3 is a partial right end view of FIG. 1.

Also in accordance with the present invention, the feed nut 66 is connected to a feed nut bevel gear 72, which is annular in form, like the feed nut 66 itself. A feed nut drive system includes another 45° bevel gear 75 that engages the bevel gear 72 on feed nut 66. Bevel gear 74 is connected to a first feed nut drive shaft portion 76, which in turn is connected to a second feed nut drive shaft portion 78 that is mounted within a casing 80 for the feed nut drive shaft assembly. A suitable bushing means 82 supports the feed nut drive shaft portion 78 within the casing 80. A hand knob 84 is provided to enable manipulation of the feed nut drive system, which is separable as an assembly from the housing 10 when the casing 80 is removed from said housing by removing fasteners 86 (FIG. 3). Removal of the feed nut drive assembly (gear 74, shaft portions 76, 78, knob 84 and casing 80) can be accomplished without disassembling the remainder of the tool (except that the mandrel will usually be removed from the tool before disassembly of the feed nut drive shaft assembly). This arrangement of the feed nut drive system permits inspection and repair of the feed drive system without dismantling the entire tool. The casing 80, moreover, is secured to the housing 10 by a square bolt pattern (see FIG. 3) whereby the entire feed nut drive assembly can be secured to the housing 12 in four different radial positions. This is an extremely convenient arrangement that permits an operator to adjust the tool shape to accommodate different operating conditions or environments. Other means, of course, can readily be used to attach the casing 80 to the housing 10, as long as the ability to secure the casing to the housing at various radial positions is maintained.

The feed nut drive shaft portions 76, 78 are disposed along a transverse axis 86 and, in the preferred embodiment, axis 86 is parallel to axis 50 of the motor 44 and cutter head drive shaft part 40. These elements preferably lie in the same general plane that includes longitudinal axis 12 which results in an extremely convenient arrangement for advancing the feed nut 66. It will be apparent that manipulation of the housing 10 by grasping motor 44 can be accomplished with one hand, while the other hand of the operator can conveniently engage and manipulate feed nut knob 84 from the same side of the tool. In the prior art arrangements, the feed nut drive knob normally is disposed along the axis of the tool housing, and this can present problems to the tool operator when the tool is being used in extremely close quarters when other structure is located close to the tool housing, a situation commonly encountered when preparing heat exchanger tubes in a tube assembly. By locating the motor 44 and its associated drive shaft system in parallel with the feed nut drive system to one side of the tool, the overall length of the tool is held to a minimum, the tool can be utilized in extremely confined surroundings, and, when performing overhead bevel cuts, the operator's hand on the feed knob is removed from the falling cutting fluid and chips.

Various changes within the knowledge of a skilled mechanic can be made to the disclosed embodiment, which is exemplary, only, without departing from the spirit and scope of the invention.

I claim:

1. A portable tube end preparation tool comprising:
   (a) a housing extending along a longitudinal axis, the housing having first and second ends;
   (b) a cutter head mounted adjacent the first end of the housing for rotation about said longitudinal axis;
   (c) cutter head drive means connected to said cutter head for transmitting rotational force thereto and including a first drive shaft part extending along said longitudinal axis within said housing and a second drive shaft part drivingly connected to said first part and rotatable about a first transverse axis extending perpendicular to said longitudinal axis;
   (d) tool feed means including an internally threaded feed nut with an external bevel gear mounted for rotation about said longitudinal axis within the housing axially spaced from said second drive shaft part;
   (e) a casing having a feed nut drive shaft rotatably supported therein and means to rotate the feed nut drive shaft, bevel gear means on the feed nut drive shaft coacting with the external bevel gear; and,
   (f) means to removably attach the casing to the second end of the housing in a plurality of positions such that it is removable in the direction of the longitudinal axis and such that, in each position, the feed nut drive shaft is drivingly connected to the feed nut to transmit rotational force thereto and the rotational axis of the feed nut drive shaft extends perpendicular to the longitudinal axis.

2. A tool as claimed in claim 1, wherein the second drive shaft part and the feed nut drive shaft extend parallel to each other and lie in a common plane with said longitudinal axis.

3. A tool as claimed in claim 2, wherein the cutter head drive means comprises: a cutter head drive motor removably connected to the exterior of the housing and to the second drive shaft part, said drive motor including a motor housing extending along said first transverse axis.

4. A tool as claimed in claim 1, wherein the first and second cutter head drive shaft parts are connected together through a first pair of 45° bevel gear means, and wherein said feed nut and feed nut drive shaft are connected together by a second pair of 45° bevel gear means.

5. A tool as claimed in claim 1, wherein the second drive shaft part and the feed nut drive shaft each comprise independent separate assemblies that are separable from the exterior of said housing while the cutter head drive shaft and the feed nut remain assembled within the housing.

6. A tool as claimed in claim 1, wherein the housing, the cutter head, the first drive shaft part and the feed nut define a longitudinal opening therethrough; and further comprising a mandrel including a mandrel drive shaft extending through said opening, said mandrel having means thereon to connect a tube workpiece to the tool during tool operation; and key and slot means between the mandrel shaft and the housing to prevent relative rotation therebetween.

7. A tool as claimed in claim 6, including rolling bearing means between said mandrel shaft, and said first and second drive shaft parts.

8. A tool as claimed in claim 7, wherein said rolling bearing means comprising at least a pair of longitudinally spaced rolling bearing assemblies.

* * * * *